July 1, 1924.
J. H. LACY
1,499,375
AUTOMOBILE BRAKE GUARD
Filed Feb. 6, 1922
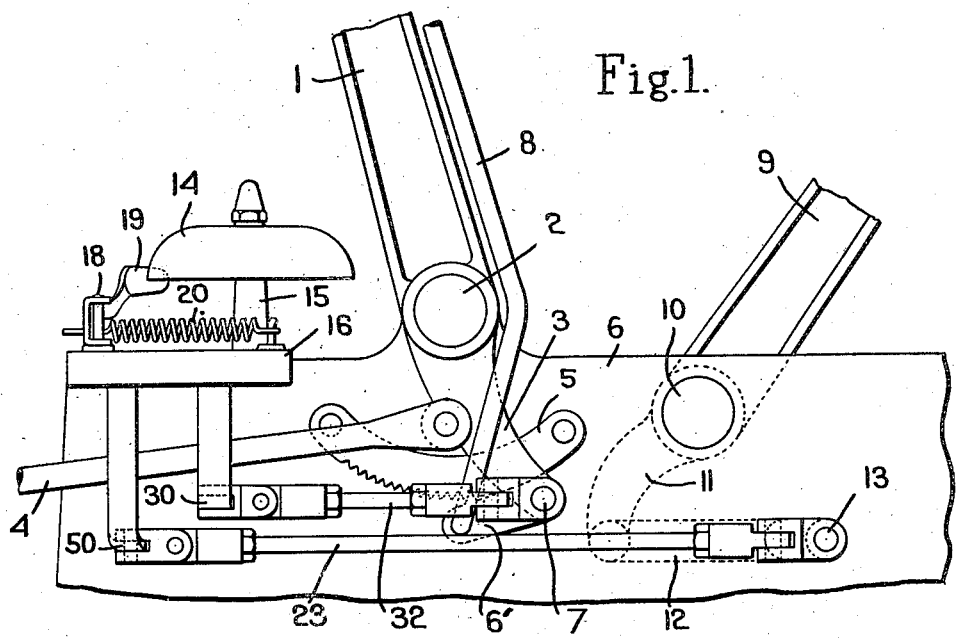
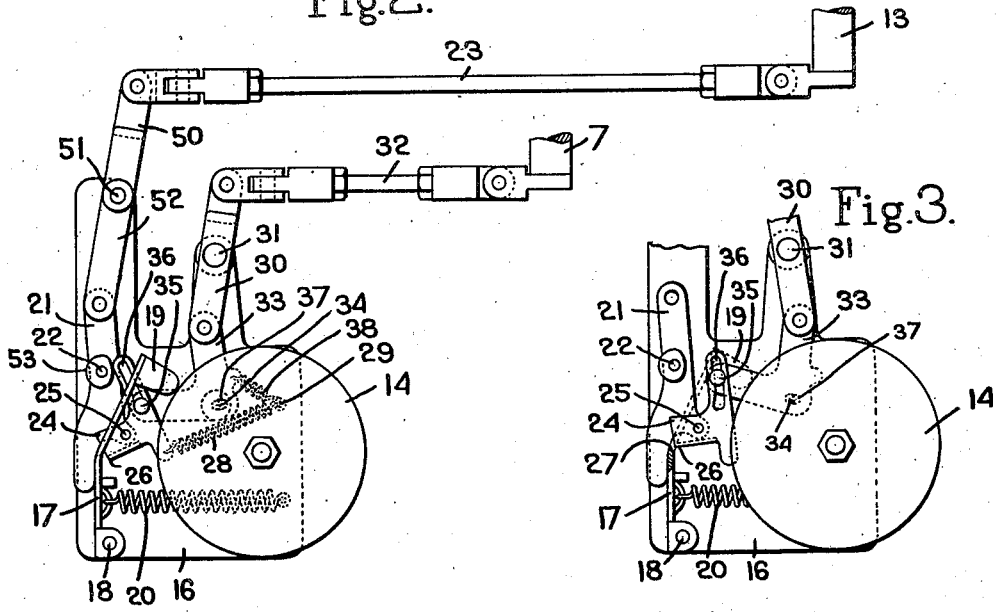
Inventor.
John H. Lacy
by Heard Smith & Tennant
Attys.

Patented July 1, 1924.

1,499,375

UNITED STATES PATENT OFFICE.

JOHN HOWARD LACY, OF BOSTON, MASSACHUSETTS.

AUTOMOBILE BRAKE GUARD.

Application filed February 6, 1922. Serial No. 534,367.

*To all whom it may concern:*

Be it known that I, JOHN HOWARD LACY, a citizen of the United States, and resident of Boston, county of Suffolk, State of Massachusetts, have invented an Improvement in Automobile Brake Guards, of which the following description, in connection with the accompanying drawing, is a specification, like characters on the drawing representing like parts.

This invention relates to and has for its object the provision of means for guarding the brake of an automobile or similar machine so as to prevent the starting thereof with the brake wholly or partially applied.

The object of this invention is to provide mechanically controlled mechanism for preventing the operator of an automobile from starting or attempting to start the automobile with a brake, such as the emergency brake, applied or in locking position which is obviously undersirable because resulting in undue strain upon the engine and upon the mechanism of the vehicle and producing excessive wear upon the brake mechanism.

The object of the invention is more particularly to provide suitable mechanism for preventing such an occurrence through a mechanically controlled means, such as a mechanically operated audible signal which will be operated whenever the brake mechanism is applied and an actuator, such for example as the clutch, is moved to effect the connection of the engine to the driving elements.

The object of the invention is further to provide a simple and practical mechanical construction which may readily be embodied in existing automobiles. These and other objects and features of the invention will appear more fully from the accompanying description and drawings and will be particularly pointed out in the claims.

In the drawings:

Fig. 1 is a side elevation of the main portions of a preferred form of mechanically controlled apparatus embodying the invention in position in an ordinary type of automobile mechanism;

Fig. 2 is a top plan view of a portion of the construction shown in Fig. 1 with the parts in position to effect the actuation of the signal;

Fig. 3 is a view similar to Fig. 2 with the parts in position such that the signal will not be actuated.

The invention being adaptable to a wide range of machines such for example as automobiles, and not being concerned with any of the mechanism of the machine or vehicle, other than those parts to which it is directly connected, it is unnecessary to illustrate or describe in detail the mechanism of the machine or automobile.

In the drawings a brake actuator is shown in the form of the ordinary emergency brake of an automobile comprising an upstanding arm or handle 1 connected to the horizontal rotatable shaft 2, the arm 3 connected to and extending downwardly from the shaft 2, and the rod 4 pivoted to the arm 3 and running to the brake mechanism. The arm or handle 1 is shown as provided with means for locking it in any desired position. For this purpose a segmental ratchet 5 is secured to a side of the frame 6 beneath the shaft 2 with which co-operates a pawl 6' pivoted on a stud 7 at the lower end of the arm 3 and operated by a rod 8 extending up alongside of the arm 1. In the form illustrated it is assumed that a movement of the arm 1 and shaft 2 counter-clockwise will apply the brake mechanism while a movement in the opposite direction will release the brake mechanism.

The drawings also illustrate a connection actuator in the form of a clutch pedal arm 9 connected to a horizontally rotatable shaft 10 which in turn is provided with a depending arm 11 connected at its lower end by a link 12 to a rod 13. This mechanism is of a familiar type and is so arranged that the lateral bodily shift of the rod 13 will control the clutch which connects and disconnects the engine to the driving element or rear wheels of the automobile. In the construction illustrated it is assumed that when the clutch pedal arm 9 is moved counter-clockwise the engine will be connected to the driving elements and when moved in the opposite direction will be disconnected therefrom.

It is to be understood, of course, that there may be other and additional means for effecting the connection and disconnection of the engine to the driving elements, such for example as the usual transmission mechanism.

The invention in fact is to be considered as utilizing any connection actuator which is movable to effect the connection and disconnection of the engine to the driving elements, that is to say any one of the various elements which have to be moved to effect this result such as the clutch pedal, the transmission lever, or any other such member.

The invention includes a mechanically operated signal which may be of any suitable type. As illustrating a preferred embodiment of the invention an audible signal in the form of a bell is shown. The bell 14 shown is mounted on a vertical post 15 extending upward from a base plate 16 mounted at any convenient position on any suitable portion of the frame 6. The bell is shown as sounded by a movable striker in the form of an arm 17 pivoted at 18 on the base plate 16 and carrying a head 19 adapted to contact with and sound the bell. A helical spring 20 connected at one end to the base 16 and at the other end to the arm 17 tends normally to bring the striker into contact with the bell.

A lever 21 is fulcrumed at 22 on the base plate 16 and connected by an adjustable link 23 to some portion of the connection actuator such as the rod 13 so as to form in effect a portion of the connection actuator. If, as assumed, a movement of the rod 13 to the left disconnects the clutch a reversing lever 50 fulcrumed at 51 on a projection 52 of the base plate 16 is interposed between the link 23 and the lever 21. A dog 24 is mounted upon the lever 21 in such a manner as to move bodily therewith and also to have relative movement with respect thereto. For that purpose it is shown as pivoted at 25 to the lever 21. This dog is provided with a projection 26 so located with respect to a shoulder 27 on the striker arm 17 that when the dog is in one position, for example as shown in Fig. 2, and the lever 21 is rocked clockwise this shoulder 26 will not clear the shoulder 27 and the striker arm will be moved counter-clockwise until the projection 26 passes the shoulder when the striker arm will fly back and ring the bell; but if the dog is in the position shown in Fig. 3 and the lever 21 is moved clockwise the projection 26 will pass the shoulder 27 and there will be no operation of the striker arm and consequently no sound of the bell. The dog is held normally in the position shown in Figure 2 by means of a helical spring 28 connecting it to a pin 29 on the base plate 16.

The position of the dog 26 with respect to the lever 21 is controlled by the position of the brake actuator. For that purpose a lever 30 is fulcrumed at 31 on the base plate 16 and connected by an adjustable link 32 to a movable portion of the brake actuator such as the stud 7. The lever 30 in turn is pivoted to a bell crank lever 33 fulcrumed at 34 on the base plate 16 and having at its opposite end a pin 35 riding in a slot 36 in the dog on the opposite side of the fulcrum 25 from the point to which the spring 28 is connected. The bell crank lever 33 is loosely fulcrumed on the pin 34 and for that purpose is shown as slotted at 37 and normally retracted by a helical spring 38 connected also to the pin 29.

The simple and preferred form of construction thus illustrated and described may readily be adapted to existing automobiles of all kinds and the general principles under which it operates may readily be adapted to suit particular and varying conditions.

The operation of the apparatus will be apparent. Under normal running conditions the brake actuator arm 1 stands in releasing position or substantially in the extreme opposite position to that shown in Fig. 1 and the clutch actuator pedal arm 9 stands about as shown in Fig. 1 in the position which it assumes when the clutch is engaged and connection is effected between the engine and the driving elements. When the actuators are in this position the depending arm 3 of the brake actuator stands at the extreme left, the link 32 is pushed to the left bringing the lever 30 and the bell crank lever 33 about to the position shown in Fig. 3. This causes the dog 24 to be rocked into the position shown in Fig. 3 so that it will clear the shoulder 27 on the striker 17. If now the connection actuator, such as the clutch pedal 9 be operated as by the foot of the operator the rod 13 will be moved rearwardly carrying with it the link 23 and rocking the lever 21 from the position such as shown in Fig. 3 so as to carry the dog 24 pivotally connected thereto at 25 bodily to the left. This movement will, however, produce no actuation of the signal because the projection 26 of the dog will pass by the shoulder 27 of the striker. The dog 24 is guided during this movement so as to have little or no movement relatively to the lever 21 but only to move bodily therewith by the slot 36 in the dog riding over the pin 35 on the bell crank lever 33. If however, the brake actuator has been moved away from releasing position so as partially or wholly to apply the brake and brought towards or to the position in which the arm 1 is shown in Fig. 1 then the depending arm 3 will have moved to the right carrying with it the link 32 and rocking the levers 30 and 33 toward or into the position shown in Fig. 2. This movement swings the dog 24 on its pivot 25 so as to bring the shoulder 26 in position where if the dog be moved bodily this shoulder will contact with the striker arm 17. With the brake actuator in such a position if now the connection actuator be actuated, as in the example illustrated by moving the clutch pedal arm 9 to disconnect the clutch the rod 13 will be moved to the left carrying with it the link 23 and rocking the bell crank lever 21 so as to move the dog bodily toward the striker arm. The dog will now catch against the striker arm and swing it to the left against the tension of the spring 20 until the projection 26 slides off of the shoulder 27 when the striker will fly back under the action of the spring 20 and sound the bell. During this bodily movement of the dog its slotted end is preferably held in engagement with a cam shaped washer 53 on the pivot 22 and preferably also a slight bodily movement of the bell crank lever 33 is permitted by means of the slot 37 therein sliding on the pivot 34. The spring 28 acts to hold the dog in position and the spring 29 tends to restore the bell crank lever to its proper pivotal position.

It will thus be seen that whenever the brake actuator is in releasing position there can be no actuation of the signal whenever the connection actuator is operated so that during the operation of the car when the brake actuator has not been moved toward or to applying position or away from releasing position the signal is inert. If, however, the brake actuator is moved wholly or partially to apply the brakes, a movement of the clutch actuator at once sounds the signal and the attention of the operator is directed to the condition of the brake. The device is shown as applied to the clutch actuator because in starting the car the operator universally and automatically places his foot upon the clutch pedal either before starting the engine or before shifting the transmission. In either case if the brake is wholly or partially applied the signal will be sounded.

Having thus described my invention, what I claim as new and desire to secure by Letters Patent, is:

1. In an automobile a brake actuator movable to apply and release brake mechanism, a connection actuator movable to effect the connection and disconnection of the engine to the driving elements, a mechanically operated signal, and means controlled by the absence of the brake actuator from releasing position to operate the signal upon a movement of the connection actuator requisite to effect connection of the engine to the driving elements.

2. In an automobile a brake actuator movable to apply and release brake mechanism, a connection actuator movable to effect the connection and disconnection of the engine to the driving elements, an audible signal, a signal actuator, a dog acting when in operative position to effect the actuation of the signal actuator upon a movement of the connection actuator requisite to effect connection of the engine to the driving elements, and means controlled by the brake actuator acting to maintain the dog in operative position upon the absence of the brake actuator from releasing position.

3. In an automobile a brake actuator movable to apply and release brake mechanism, a connection actuator movable to effect the connection and disconnection of the engine to the driving elements, an audible signal, a signal actuator, a dog acting when in operative position to effect the actuation of the signal actuator upon a movement of the connection actuator requisite to effect connection of the engine to the driving elements, and means controlled by the brake actuator acting to maintain the dog in operative position upon the absence of the brake actuator from releasing position, and to withdraw the dog from operative position when the brake actuator is in releasing position.

4. In an automobile a brake actuator movable to apply and release brake mechanism, a connection actuator movable to effect the connection and disconnection of the engine to the driving elements, a bell, a movable striker for the bell, a dog movably mounted on the connection actuator and acting when in operative position to engage and effect the actuation of the striker upon a movement of the connection actuator requisite to effect connection of the engine to the driving elements, and means controlled by the brake actuator acting to maintain the dog in operative position upon the absence of the brake actuator from releasing position.

5. In an automobile a brake actuator movable to apply and release brake mechanism, a connection actuator movable to effect the connection and disconnection of the engine to the driving elements, a bell, a movable striker for the bell, a dog movably mounted on the connection actuator and acting when in operative position to engage and effect the actuation of the striker upon a movement of the connection actuator requisite to effect connection of the engine to the driving elements, and means controlled by the brake actuator acting to maintain the dog in operative position upon the absence of the brake actuator from releasing position, and to withdraw the dog from operative position when the brake actuator is in releasing position.

In testimony whereof, I have signed my name to this specification.

JOHN HOWARD LACY.